Oct. 16, 1928.

E. O'TOOLE

HEADING MACHINE

Filed Aug. 21, 1926

E. O'TOOLE 1,687,949

HEADING MACHINE

Filed Aug. 21, 1926  2 Sheets-Sheet 2

Witnesses:
Edwin Trueb

Inventor:
EDWARD O'TOOLE,
by D. Anthony Usina
his Attorney.

Patented Oct. 16, 1928.

1,687,949

UNITED STATES PATENT OFFICE.

EDWARD O'TOOLE, OF GARY, WEST VIRGINIA.

HEADING MACHINE.

Application filed August 21, 1926. Serial No. 130,712.

This invention relates to mining machines, and more particularly to heading machines for driving mine headings, and has for one of its objects the provision of a machine of this type which will simultaneously undercut the coal at the face of the heading, trim or shear the side walls of the heading, and convey away the material broken down from the heading face.

Another object is to provide a novel form of machine for driving mine headings having a novel form of advancing mechanism whereby one side of the machine may be advanced at a different speed than the other in order to drive headings at an angle or on a curve.

A further object is to provide a machine of the class described, having the novel construction, design and combination of parts hereinafter described and illustrated in the accompanying drawings.

In the drawings—

Figure 2 is a side elevation of the machine, with a part of the conveyer plate and combined cutter and conveyer chain removed for clearness.

Figure 3 is a sectional elevation taken on the line III—III of Figure 1.

Figure 1:
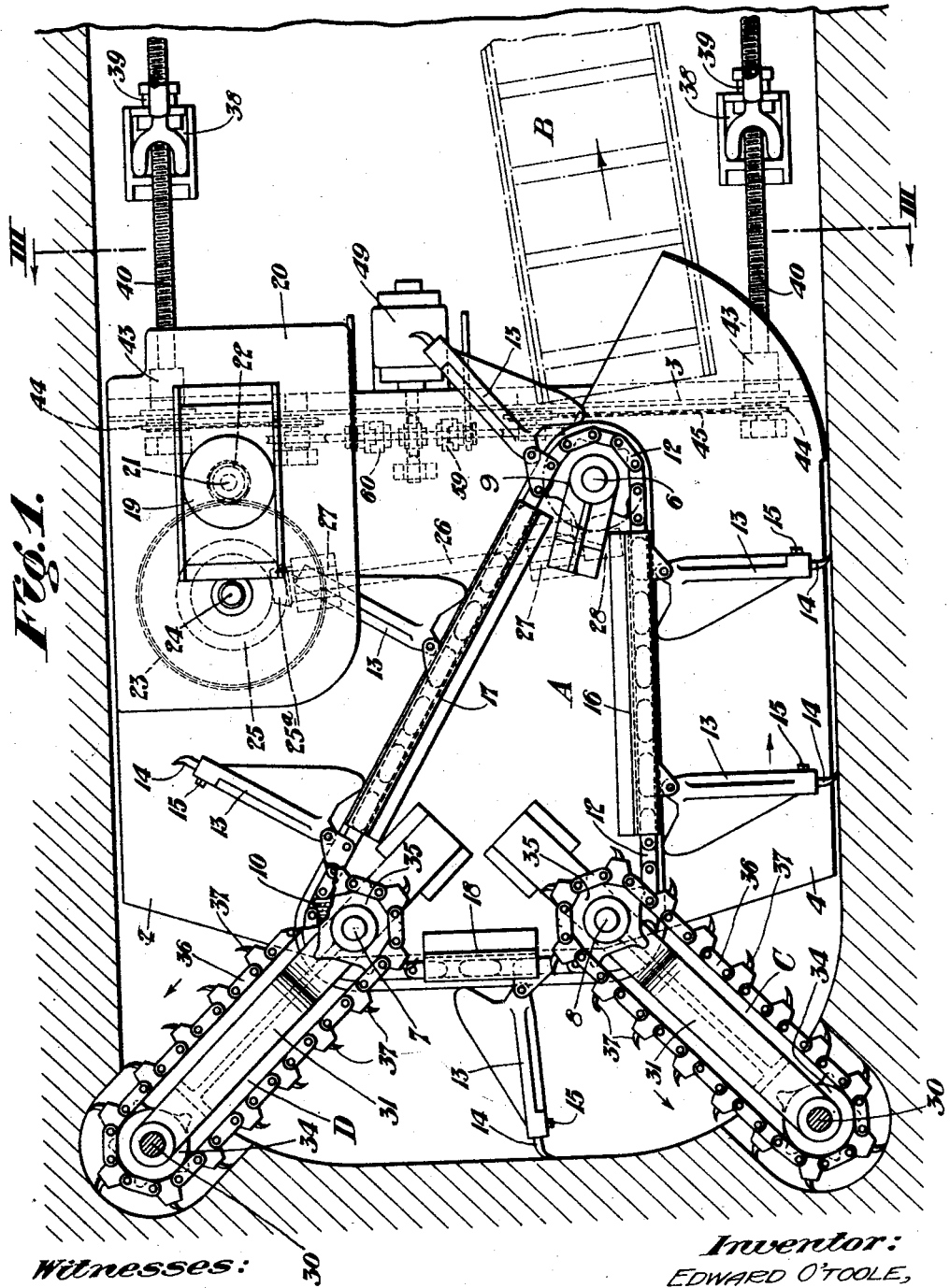
Figure 1 is a plan view of a machine constructed in accordance with my invention.

Referring more particularly to the drawings, the letter A designates the frame of the machine composed of a base plate 2, a rear channel beam 3 extending transversely along the rear edge of and secured to the base plate 2, a conveyer plate 4 secured to the upper face of the beam 3 and inclined downwardly to the forward edge of the base plate 2.

A power shaft 6 is journaled in the frame A adjacent its rear end, and a pair of idler shafts 7 and 8 are journaled in the frame adjacent the forward edge thereof. The shafts 7 and 8 are spaced transversely so that the shafts 6, 7 and 8 form the three corners of a substantially triangular outline.

Sprockets 9, 10 and 11 are mounted on the shafts 6, 7 and 8 respectively, and a combined cutter and conveyer chain 12 is trained around the sprockets. Overhanging conveyer-flights 13 are secured at their rear ends to the chain 12 at spaced intervals. The heads of the flights 13 are provided with suitable sockets in which are mounted cutter-tools or bits 14 which are held in position by set-screws 15.

Suitable chain guides 17, 18, and 16 are mounted between the sprockets 9 and 10, 10 and 11, and 11 and 9, respectively, to support and guide the chain.

The power shaft 6 is adapted to be driven by a vertical motor 19 mounted on a motor base 20. The motor 19 has its armature shaft 21 provided with a pinion 22 which meshes with a gear 23 on a shaft 24 journaled in the motor base 20 and carrying a bevel gear 25 which is meshed with a bevel pinion 25$^a$ on a drive shaft 26. The shaft 26 is journaled in bearings 27 and carries a worm 28 which meshes with a worm-wheel 29 on the power shaft 6.

When the motor 19 is started the shaft 6 and sprocket 9 will be driven, and in turn drive the chain 12 so as to move the conveyer-flights 13 and cutter-bits 14 across the heading face, thus undercutting the face to form a kerf and conveying away the cuttings or bug-dust and any broken down material.

The material conveyed by the flights 13 will be pulled up along the conveyer plate 4 and discharged at the rear of the machine.

Any suitable means may be provided at the rear of the machine for receiving the mined material. In the drawings I have shown a section of a conveyer B adapted to receive the material discharged from the machine. However, the material may be discharged directly into mine cars or other conveying means, as desired.

In order to shear and trim the side walls of the heading, I provide a pair of side wall shearing cutters C and D, which are composed of vertical cutter bars or posts 30 journaled in overhanging supporting arms 31 and carrying cutter-tools or bits 32. The arms 31 extend forwardly and outwardly on an angle from each forward corner of the main frame of the machine and have their forward ends slotted at 33 to receive a sprocket 34 mounted on the bar 30.

The idler shafts 7 and 8 extend upwardly through the arms 31 and have sprockets 35 secured to their upper ends. Combined cutter and drive chains 36 are trained around the sprockets 34 and 35 to drive the bars 30, and such chains 36 carry cutter-bits 37 to cut a path in the side walls of the heading to receive the sprockets 34.

From the above it will be evident that when the combined conveyer and cutter chain 12 is operated, it will rotate the sprockets 10 and 11 and shafts 7 and 8, which shafts will in turn drive the bars 30 through the sprockets 35 and 34 and chains 36. Therefore the bars 30 and chain 12 will be simultaneously operated.

In order to advance the machine, I provide a pair of jacks 38 which are provided with nuts 39 in their bases to receive threaded feed bars 40. The bars 40 have squared forward ends 41 removably secured in sockets 42 in bar operating shafts or stubs 43. The stubs 43 are journaled in the main frame of the machine and carry sprockets 44 which are connected by sprocket drive chains 45 to sprockets 46 on drive shafts 47 and 48 respectively, which are journaled on the main frame A.

The shafts 47 and 48 are independently driven from a motor 49. The motor 49 has its armature shaft 50 provided with a worm 51 which meshes with a worm-wheel 52 on a sleeve 53 journaled on the ends of shafts 54 and 54$^a$. The shafts 54 and 54$^a$ are provided with worms 55 and 56, respectively, which mesh with worm-wheels 57 and 58 respectively, on the respective shafts 47 and 48.

The sleeve 53 is provided with clutch members 59 and 60 at its opposite ends which are adapted to be engaged by clutch members 61 and 62 which are slidably keyed on the shafts 54 and 54$^a$ respectively.

When the machine is in operation the motor 49 is operated and the clutch members 59 and 61, and 60 and 62 are engaged so that the screw-bars 40 will be rotated to advance the machine in a straight heading. However, if it is desired to form a curved heading or to drive the heading at an angle, one of the sets of clutches 59, 61 or 60, 62 will be disengaged to allow one side of the machine to be advanced ahead of the other.

While I have described one specific embodiment of my invention, it will be understood that I do not wish to be limited to the specific details thereof, since various modifications may be made without departing from the scope of my invention as defined in the appended claims.

I claim:

1. A heading machine, comprising a main frame, a driving sprocket and a pair of idler sprockets mounted on shafts journaled in said frame, a combined cutter and conveyer chain trained over said sprockets, overhanging conveyer-flights mounted on said chain, cutter-tools mounted in the free outer ends of said flights, a pair of side wall shearing cutters arranged adjacent each of the front corners of said frame, means for driving said driving sprocket, and means forming a driving connection between said idler sprockets and said side wall shearing cutters whereby said side wall shearing cutters will be driven by said idler sprockets and will operate simultaneously with said combined cutter and conveyer chain.

2. A heading machine, comprising a main frame, a driving sprocket and a pair of idler sprockets mounted on shafts journaled in said frame, a combined cutter and conveyer chain trained over said sprockets, overhanging conveyer-flights mounted on said chain, cutter-tools mounted in the free outer ends of said flights, a pair of side wall shearing cutters arranged adjacent each of the front corners of said frame, means for driving said driving sprocket, means forming a driving connection between said combined cutter and conveyer chain and said side wall shearing cutters whereby said side wall shearing cutters will be driven by and simultaneously with said chain, and means for advancing said machine.

3. A heading machine, comprising a main frame, a driving sprocket and a pair of idler sprockets mounted on shafts journaled in said frame, a combined cutter and conveyer chain trained over said sprockets, overhanging conveyer-flights mounted on said chain, cutter-tools mounted in the free outer ends of said flights, a pair of side wall shearing cutters arranged adjacent each of the front corners of said frame, means for driving said driving sprocket, means forming a driving connection between said combined cutter and conveyer chain and said side wall shearing cutters whereby said side wall shearing cutters will be driven by and simultaneously with said chain, means for advancing said machine, and means for operating said last named means separate from the means for driving said driving sprocket.

4. A heading machine, comprising a main frame, a driving sprocket and a pair of idler sprockets mounted on shafts journaled in said frame, a combined cutter and conveyer chain trained over said sprockets, overhanging conveyer-flights mounted on said chain, cutter-tools mounted in the free outer ends of said flights, a pair of side wall shearing cutters arranged adjacent each of the front corners of said frame, means for driving said driving sprocket, means forming a driving connection between said combined cutter and conveyer chain and said side wall shearing cutters whereby said side wall shearing cutters will be driven by and simultaneously with said chain, a pair of screw advancing bars journaled in the frame of said machine and projecting rearwardly therefrom, jacks fixedly mounted to the rear of said machine, nuts fixed in said jacks and having a threaded engagement with said bars, and power means for rotating said bars.

5. A heading machine, comprising a main frame, a driving sprocket and a pair of idler sprockets mounted on shafts journaled in said frame, a combined cutter and conveyer chain trained over said sprockets, overhanging conveyer-flights mounted on said chain, cutter-tools mounted in the free outer ends of said flights, a pair of side wall shearing cutters arranged adjacent each of the front corners of said frame, means for driving said driving sprocket, means forming a driving connection between said combined cutter and conveyer chain and said side wall shearing cutters whereby said side wall shearing cutters will be driven by and simultaneously with said chain, a pair of screw advancing bars journaled in the frame of said machine and projecting rearwardly therefrom, jacks fixedly mounted to the rear of said machine, nuts fixed in said jacks and having a threaded engagement with said bars, power means for rotating said bars together or independently.

6. A heading machine, comprising a main frame, a power shaft journaled in said frame adjacent the rear end thereof, a pair of spaced idler shafts journaled in said frame adjacent the forward end thereof, sprockets mounted on said shafts, a combined cutter and conveyer chain trained over said sprockets overhanging conveyer-flights mounted on said chain, cutter-tools mounted in the free ends of said conveyer-flights, an overhanging supporting arm projecting forwardly and outwardly from each forward corner of said frame, a vertical cutter bar journaled in each of said arms, cutter-tools mounted in said bar, and driving means connecting said bars with said idler shafts whereby said bars will be operated simultaneously with and receive their power from said combined cutter and conveyer flights.

7. A heading machine, comprising a main frame, a power shaft journaled in said frame adjacent the rear end thereof, a pair of spaced idler shafts journaled in said frame adjacent the forward end thereof, sprockets mounted on said shafts, a combined cutter and conveyer chain trained over said sprockets, overhanging conveyer-flights mounted on said chain, cutter-tools mounted in the free ends of said conveyer-flights, an overhanging supporting arm projecting forwardly and outwardly from each forward corner of said frame, a vertical cutter bar journaled in each of said arms, cutter-tools mounted in said bar, a power sprocket on each of said bars, sprockets on said vertical idler shafts, and a combined driving and cutter chain trained over said sprockets, said chain being adapted to cut a path in the side wall to receive said power sprockets on said bars, and to drive said bars.

8. A mine heading machine comprising a main frame, sprocket-wheels mounted thereon, a cutter chain trained about said sprockets for undercutting the face to form a kerf, side wall cutters journaled in supporting arms projecting from the opposite sides of the main frame, and means including at least some of said sprockets and said cutter chain for operating said side wall cutters simultaneously with said cutter chain.

In testimony whereof, I have hereunto set my hand.

EDWARD O'TOOLE.